(12) United States Patent
Okuno et al.

(10) Patent No.: US 11,271,215 B2
(45) Date of Patent: Mar. 8, 2022

(54) METAL POROUS BODY AND CURRENT COLLECTOR FOR NICKEL-METAL HYDRIDE BATTERY

(71) Applicants: SUMITOMO ELECTRIC INDUSTRIES, LTD., Osaka (JP); SUMITOMO ELECTRIC TOYAMA CO., LTD., Imizu (JP); PRIMEARTH EV ENERGY CO., LTD., Kosai (JP)

(72) Inventors: Kazuki Okuno, Osaka (JP); Masatoshi Majima, Osaka (JP); Hitoshi Tsuchida, Imizu (JP); Junichi Nishimura, Imizu (JP); Koutarou Kimura, Imizu (JP); Yusuke Shimizu, Kosai (JP)

(73) Assignees: SUMITOMO ELECTRIC INDUSTRIES, LTD., Osaka (JP); SUMITOMO ELECTRIC TOYAMA CO., LTD., Imizu (JP); PRIMEARTH EV ENERGY CO., LTD., Kosai (JP)

( * ) Notice: Subject to any disclaimer, the term of this patent is extended or adjusted under 35 U.S.C. 154(b) by 178 days.

(21) Appl. No.: 16/627,830

(22) PCT Filed: Jul. 11, 2018

(86) PCT No.: PCT/JP2018/026137
§ 371 (c)(1),
(2) Date: Dec. 31, 2019

(87) PCT Pub. No.: WO2019/017252
PCT Pub. Date: Jan. 24, 2019

(65) Prior Publication Data
US 2020/0373585 A1    Nov. 26, 2020

(30) Foreign Application Priority Data

Jul. 18, 2017   (JP) .............................. JP2017-139115

(51) Int. Cl.
*H01M 4/80*     (2006.01)
*C22C 1/08*     (2006.01)
(Continued)

(52) U.S. Cl.
CPC ................. *H01M 4/80* (2013.01); *C22C 1/08* (2013.01); *H01M 4/661* (2013.01); *H01M 4/667* (2013.01); *H01M 10/345* (2013.01)

(58) Field of Classification Search
CPC ........ H01M 4/80; H01M 4/661; H01M 4/669; H01M 4/667; H01M 10/345; C22C 1/08
See application file for complete search history.

(56) References Cited

U.S. PATENT DOCUMENTS 5,405,719 A * 4/1995 Sonoda ............... H01M 10/345
429/223
2016/0379764 A1  12/2016 Tour et al.

FOREIGN PATENT DOCUMENTS

EP    2 644 722 A2    10/2013
JP    3643732 B2 *   4/2005    ............. Y02E 60/10
(Continued)

OTHER PUBLICATIONS

English Translation of JP-2016169429-A; Fujita Takeshi, Porous Metal and Manufacturing Method Thereof, and power storage device, 2016 (Year: 2016).*
(Continued)

*Primary Examiner* — Maria Laios
*Assistant Examiner* — Adam J Francis
(74) *Attorney, Agent, or Firm* — Oliff PLC

(57) ABSTRACT

A metal porous body is a metal porous body mainly composed of nickel and having a framework of a three-dimensional network structure, $Ni(OH)_2$ being present in a surface of the framework, when the metal porous body is subjected to at least 30 potential scans between a lower limit potential (Continued)

of −0.10 V and an upper limit potential of +0.65 V with respect to a hydrogen standard potential in not less than 10% by mass and not more than 35% by mass of a potassium hydroxide aqueous solution, at least oxygen being detected within a depth of 5 nm from the surface, and hydrogen being detected at least in the surface.

10 Claims, 7 Drawing Sheets

(51) Int. Cl.
*H01M 4/66* (2006.01)
*H01M 10/34* (2006.01)

(56) References Cited

FOREIGN PATENT DOCUMENTS

| JP | 2010-140647 A |   | 6/2010 |   |
|----|---------------|---|--------|---|
| JP | 2015-071804 A |   | 4/2015 |   |
| JP | 2016-48609 A  |   | 4/2016 |   |
| JP | 2016-169429 A |   | 9/2016 |   |
| JP | 2016169429 A  | * | 9/2016 | ............. Y02E 60/10 |

OTHER PUBLICATIONS

English Translation of JP-3643732-B2; Ando Hideki, Manufacture of Alkali Storage Battery, 2005, Sanyo electric CO LTD. (Year: 2005).*

* cited by examiner

METAL POROUS BODY AND CURRENT COLLECTOR FOR NICKEL-METAL HYDRIDE BATTERY

TECHNICAL FIELD

The present disclosure relates to a metal porous body and a current collector for a nickel-metal hydride battery. The present application claims the benefit of priority to Japanese Patent Application No. 2017-139115 filed on Jul. 18, 2017, the entire contents of which are incorporated herein by reference.

BACKGROUND ART

Conventionally, a metal porous body has been used for various applications such as a filter and an electrode plate for a battery that require heat resistance, a catalyst carrier, and a composite metal material. A method for subjecting a surface of a base material such as foamed resin to conductive treatment and then plating the surface of the base material with metal, and a method for producing slurry of a powder metal, causing the slurry of the powder metal to adhere to a base material such as foamed resin and sintering the slurry of the powder metal have been traditionally known as a method for manufacturing a metal porous body.

As a metal porous body fabricated by a plating method, there has been known, for example, Celmet (registered trademark: manufactured by Sumitomo Electric Industries, Ltd.) which is a metal porous body substantially made of nickel and obtained by subjecting a surface of a framework of a resin molded body having a framework of a three-dimensional network structure to conductive treatment and then plating the surface with nickel and then removing the resin. Celmet is a metal porous body having pores that communicate with each other, and has a characteristic of having a very high porosity (not less than 90%) as compared with other porous bodies such as metal non-woven fabric. Therefore, Celmet is suitably used as an electrode material for a battery such as a nickel-metal hydride battery or a nickel-cadmium battery.

Various methods are under study as a method for manufacturing Celmet. For example, Japanese Patent Laying-Open No. 2010-140647 (PTL 1) describes a metal porous body having significantly improved quality by subjecting a resin molded body which is a base material to surface treatment before conductive treatment, and a method for manufacturing the metal porous body. Japanese Patent Laying-Open No. 2015-071804 (PTL 2) describes a metal porous body having excellent heat resistance and strength by containing nickel, tin and iron, and a method for manufacturing the metal porous body.

CITATION LIST

Patent Literature

PTL 1: Japanese Patent Laying-Open No. 2010-140647
PTL 2: Japanese Patent Laying-Open No. 2015-071804

SUMMARY OF INVENTION

A metal porous body according to an embodiment of the present disclosure is a metal porous body mainly composed of nickel and having a framework of a three-dimensional network structure, $Ni(OH)_2$ being present in a surface of the framework, when the metal porous body is subjected to at least 30 potential scans between a lower limit potential of −0.10 V and an upper limit potential of +0.65 V with respect to a hydrogen standard potential in not less than 10% by mass and not more than 35% by mass of a potassium hydroxide aqueous solution, at least oxygen being detected within a depth of 5 nm from the surface, and hydrogen being detected at least in the surface.

A current collector for a nickel-metal hydride battery according to an embodiment of the present disclosure includes the above-described metal porous body.

A current collector for a nickel-metal hydride battery according to another embodiment of the present disclosure is a current collector for a nickel-metal hydride battery including a metal porous body, the metal porous body being mainly composed of nickel and having a framework of a three-dimensional network structure, $Ni(OH)_2$ being present in a surface of the framework, at least oxygen being detected within a depth of 5 nm from the surface.

DETAILED DESCRIPTION

Figure 1:
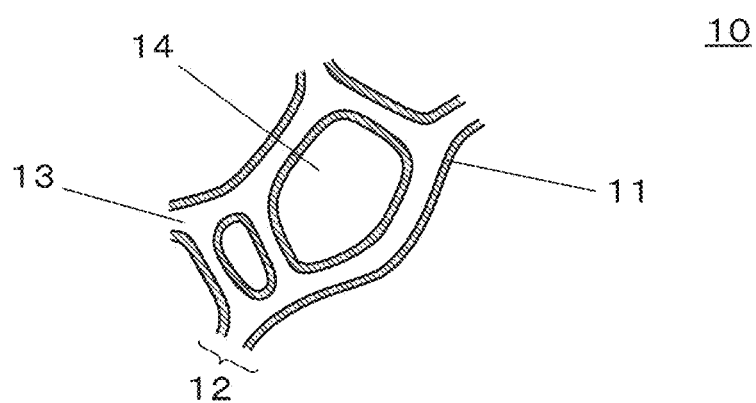
FIG. 1 is an enlarged view schematically showing a partial cross section of an example metal porous body according to an embodiment of the present disclosure.

Problem to be Solved by the Present Disclosure

Each of the metal porous bodies obtained by the methods described in PTL 1 and PTL 2 can be preferably used as a current collector for a nickel-metal hydride battery or the like. In recent years, smaller size and higher output of a battery used as a power supply of an electric vehicle or a hybrid vehicle have been requested, and thus, higher quality and further improvement of a manufacturing method have also been requested in a metal porous body so as to contribute to increase in battery performance.

Therefore, the present inventors have conducted earnest researches in order to provide a metal porous body that contributes to increase in battery performance, and have focused attention on the following point. Specifically, a surface of a framework of a metal porous body is generally covered with an oxide film, which results in relatively high contact resistance between an active material filled into a pore portion and the framework and becomes a factor for internal resistance of a battery.

The present disclosure has been made in light of the above-described problem and an object of the present disclosure is to provide a metal porous body having a framework of a three-dimensional network structure that can reduce contact resistance between a surface of the framework of the metal porous body and an active material when the metal porous body is used as a positive electrode current collector for a battery.

Advantageous Effect of the Present Disclosure

According to the foregoing, it is possible to provide a metal porous body having a framework of a three-dimensional network structure that can reduce contact resistance between a surface of the framework of the metal porous body and an active material when the metal porous body is used as a positive electrode current collector for a battery.

Description of Embodiments

First, embodiments of the present disclosure will be enumerated hereinafter.

(1) A metal porous body according to an embodiment of the present disclosure is a metal porous body mainly composed of nickel and having a framework of a three-dimensional network structure, Ni(OH)$_2$ being present in a surface of the framework, when the metal porous body is subjected to at least 30 potential scans between a lower limit potential of −0.10 V and an upper limit potential of +0.65 V with respect to a hydrogen standard potential in not less than 10% by mass and not more than 35% by mass of a potassium hydroxide aqueous solution, at least oxygen being detected within a depth of 5 nm from the surface, and hydrogen being detected at least in the surface.

According to the embodiment described in (1) above, it is possible to provide a metal porous body having a framework of a three-dimensional network structure that can reduce contact resistance between a surface of the framework of the metal porous body and an active material when the metal porous body is used as a positive electrode current collector for a battery.

(2) It is preferable that a content of NiO is lower than a content of Ni in the surface.

According to the embodiment described in (2) above, an amount of NiO present in the surface of the framework is small, and thus, it is possible to provide a metal porous body having low contact resistance between a surface of a framework and an active material when the metal porous body is used as a positive electrode current collector for a battery.

(3) It is preferable that a content of a total of Ni$_2$O$_3$ and Ni(OH)$_2$ is higher than a content of NiO in the surface.

According to the embodiment described in (3) above, an amount of NiO present in the surface of the framework is small, and thus, it is possible to provide a metal porous body having low contact resistance between a surface of a framework and an active material when the metal porous body is used as a positive electrode current collector for a battery.

(4) It is preferable that the oxygen is detected by analyzing the surface in a depth direction of the framework using Auger electron spectroscopy (AES).

According to the embodiment described in (4) above, it is possible to provide a metal porous body having low contact resistance between a surface of a framework and an active material when the metal porous body is used as a positive electrode current collector for a battery.

(5) It is preferable that Ni, NiO, Ni$_2$O$_3$, and Ni(OH)$_2$ are detected by analyzing the surface using X-ray photoelectron spectroscopy (XPS).

According to the embodiment described in (5) above, it is possible to provide a metal porous body having low contact resistance between a surface of a framework and an active material when the metal porous body is used as a positive electrode current collector for a battery.

(6) It is preferable that a peak of the NiO is absent in a spectrum of a 1s orbital of O, and area sizes of peaks of the Ni, the NiO, the Ni$_2$O$_3$, and the Ni(OH)$_2$ satisfy a relational equation of Ni>a total of Ni$_2$O$_3$ and Ni(OH)$_2$>NiO in a spectrum of three orbitals in 2p of the Ni. As a result, contact resistance between a surface of a framework and an active material can be further reduced when the metal porous body is used as a positive electrode current collector for a battery.

(7) It is preferable that the hydrogen is detected as water desorbed from the metal porous body at a temperature higher than an evaporation temperature of water adsorbed on the surface, by analyzing the surface using thermal desorption spectrometry (TDS).

According to the embodiment described in (7) above, it is possible to provide a metal porous body having low contact resistance between a surface of a framework and an active material when the metal porous body is used as a positive electrode current collector for a battery.

(8) It is preferable that the Ni(OH)$_2$ is detected as a binding energy-derived peak corresponding to the Ni(OH)$_2$ by analyzing the surface using X-ray photoelectron spectroscopy (XPS), and the hydrogen is detected as water desorbed from the metal porous body at a temperature higher than an evaporation temperature of water adsorbed on the surface, by analyzing the surface using thermal desorption spectrometry (TDS).

According to the embodiment described in (8) above, it is possible to provide a metal porous body having low contact resistance between a surface of a framework and an active material when the metal porous body is used as a positive electrode current collector for a battery.

(9) A current collector for a nickel-metal hydride battery according to an embodiment of the present disclosure includes the metal porous body as recited in any one of (1) to (8) above.

According to the embodiment described in (9) above, it is possible to provide a current collector for a nickel-metal hydride battery that can reduce contact resistance between the current collector and an active material.

(10) A current collector for a nickel-metal hydride battery according to an embodiment of the present disclosure is a current collector for a nickel-metal hydride battery including a metal porous body, the metal porous body being mainly composed of nickel and having a framework of a three-dimensional network structure, $Ni(OH)_2$ being present in a surface of the framework,
at least oxygen being detected within a depth of 5 nm from the surface.

According to the embodiment described in (10) above, it is possible to provide a current collector for a nickel-metal hydride battery that can reduce contact resistance between the current collector and an active material.

Details of Embodiment

A specific example of a metal porous body according to an embodiment of the present disclosure (hereinafter, also referred to as "the present embodiment") will be described below. The present disclosure is not limited to the description but is defined by the terms of the claims, and is intended to include any modifications within the scope and meaning equivalent to the terms of the claims.

The notation "A to B" in this specification means upper and lower limits of the range (i.e., not less than A and not more than B), and in the case where not A but only B is expressed in units, the unit of A is the same as that of B.

<Metal Porous Body>

A metal porous body according to an embodiment of the present disclosure is a metal porous body mainly composed of nickel and having a framework of a three-dimensional network structure. "Nickel" described above refers to metal nickel. "Mainly composed of nickel" means that a content of nickel in the framework of the metal porous body is not less than 50% by mass. As components other than nickel, the metal porous body may intentionally or unavoidably include, for example, silicon, magnesium, carbon, tin, aluminum, iron, tungsten, titanium, cobalt, phosphorus, boron, silver, gold and the like, as long as the effect of the present disclosure is not impaired.

The content of nickel in the framework of the metal porous body is preferably not less than 80% by mass, more preferably not less than 90% by mass, and further preferably not less than 95% by mass. As the content of nickel becomes higher, the corrosion resistance to an electrolyte, the electrochemical property and the mechanical property are improved.

FIG. 1 is an enlarged schematic view showing an enlarged cross section of an example metal porous body according to an embodiment of the present disclosure. As shown in FIG. 1, a framework 12 of a metal porous body 10 is formed of a metal 11 mainly composed of nickel. An interior 13 of framework 12 is hollow. Metal porous body 10 has pores that communicate with each other, and a pore portion 14 is formed by framework 12.

In the metal porous body according to an embodiment of the present disclosure, $Ni(OH)_2$ is present in a surface of the framework. Specifically, $Ni(OH)_2$ is present in at least a surface (hereinafter, simply referred to as "surface of the framework") of a plane opposite to interior 13 of framework 12, i.e., a plane that is in contact with pore portion 14. $Ni(OH)_2$ present in the surface of framework 12 can be detected and quantified by analyzing the surface of framework 12 of metal porous body 10 using X-ray photoelectron spectroscopy (XPS). The analysis by the XPS may be performed using an X-ray photoelectron spectrometer. The analysis by the XPS may be performed at least on the metal porous body before or after being subjected to cyclic voltammetry (CV) measurement described below.

In the metal porous body according to an embodiment of the present disclosure, $Ni(OH)_2$ may be present in a surface of a plane that is in contact with interior 13 of framework 12.

$Ni(OH)_2$ described above is detected as a binding energy-derived peak corresponding to $Ni(OH)_2$ or $Ni_2O_3$ by analyzing the surface of framework 12 of metal porous body 10 using the XPS. Furthermore, when the cyclic voltammetry (CV) measurement described below is performed, hydrogen may be detected as water desorbed from metal porous body 10 at a temperature higher than an evaporation temperature of water adsorbed on the surface of framework 12, by analyzing the surface of framework 12 of metal porous body 10 using thermal desorption spectrometry (TDS). The analysis by the TDS may be performed using a thermal desorption spectrometer.

In the metal porous body according to an embodiment of the present disclosure, when the cyclic voltammetry (CV) measurement is performed under the following measurement conditions, at least oxygen is detected within a depth of 5 nm from the surface of the framework, and preferably within a depth of 30 nm from the surface of the framework, and hydrogen is detected at least in the surface of the framework. "At least oxygen is detected within a depth of 5 nm from the surface of the framework" herein means that oxygen is invariably detected at any position within the depth of 5 nm from the surface of the framework (i.e., a depth of 0 nm). Furthermore, this means that oxygen may or may not be detected at a position exceeding the depth of 5 nm from the surface of the framework. Specifically, oxygen is detected by element analysis using Auger electron spectroscopy (AES) described below.

(Measurement Conditions)

The metal porous body is subjected to at least 30 potential scans between a lower limit potential of −0.10 V and an upper limit potential of +0.65 V with respect to a hydrogen standard potential in not less than 10% by mass and not more than 35% by mass of a potassium hydroxide aqueous solution.

The above-described oxygen detected in a depth direction from the surface of framework 12 of metal porous body 10 subjected to the CV measurement is detected by analyzing the surface of framework 12 of metal porous body 10 in the depth direction of framework 12 using the Auger electron spectroscopy (AES). The analysis by the AES may be performed using a scanning Auger electron spectrometer.

The above-described hydrogen detected in the surface of framework 12 of metal porous body 10 subjected to the CV measurement is detected as water desorbed from metal porous body 10 at a temperature higher than an evaporation temperature of water adsorbed on the surface of framework 12, by analyzing the surface of framework 12 of metal porous body 10 using the thermal desorption spectrometry (TDS). The analysis by the TDS may be performed using the thermal desorption spectrometer. Specifically, the above-described hydrogen is detected as hydrogen (element) in a water molecule desorbed from metal porous body 10 at a temperature higher than an evaporation temperature of water in the TDS.

In the metal porous body according to an embodiment of the present disclosure, $Ni(OH)_2$ is present in the surface of the framework, and thus, a content of NiO in the surface of the framework is lower than that of a conventional metal porous body. When the metal porous body is used as a current collector for a battery, NiO present in the surface of the framework becomes a cause of contact resistance between the metal porous body and an active material. Therefore, when the metal porous body according to an embodiment of the present disclosure in which the content of NiO in the surface of the framework is low is used as a current collector, a battery having low internal resistance can be provided.

Furthermore, in the case of performing the above-described CV measurement in which a load similar to a load in use as a nickel-metal hydride battery is applied, hydrogen derived from a substance other than water can also be detected using the XPS and the TDS because $Ni(OH)_2$ is present in the surface of the framework of the metal porous body. After the CV measurement, oxygen can be detected at a deeper position in the depth direction from the surface of the framework of the metal porous body.

In the metal porous body according to an embodiment of the present disclosure, the content of NiO is preferably lower than a content of Ni in the surface of framework 12. By making the content of NiO lower than the content of Ni in the surface of framework 12, the contact resistance between the surface of framework 12 of the metal porous body and the active material can be further reduced when the metal porous body is used as a current collector for a battery.

Ni and NiO present in the surface of framework 12 of metal porous body 10 can be detected and quantified by analyzing the surface of framework 12 of metal porous body 10 using the XPS. The analysis by the XPS may be performed under the same conditions as those described above.

In addition to Ni, NiO and $Ni(OH)_2$, $Ni_2O_3$ may be present in the surface of framework 12 of metal porous body 10. $Ni_2O_3$ present in the surface of framework 12 of metal porous body 10 can be detected and quantified by analyzing the surface of framework 12 of metal porous body 10 using the XPS. The analysis by the XPS may be performed under the same conditions as those described above.

In the surface of the framework of the metal porous body according to an embodiment of the present disclosure, a content of a total of $Ni_2O_3$ and $Ni(OH)_2$ is preferably higher than the content of NiO. As a result, when the metal porous body is used as a positive electrode current collector for a battery in which $Ni(OH)_2$ is used as an active material, the contact resistance between the surface of the framework of the metal porous body and the active material can be reduced and the internal resistance of the battery can be reduced.

The content of the total of $Ni_2O_3$ and $Ni(OH)_2$ being higher than the content of NiO in the surface of the framework of the metal porous body can be confirmed based on, for example, an area of a peak of the total of $Ni_2O_3$ and $Ni(OH)_2$ being detected to be larger than an area of a peak of NiO when the surface of the framework of the metal porous body is analyzed using the XPS.

In the surface of the framework of the metal porous body according to the embodiment of the present disclosure, the content of NiO is preferably lower than the content of Ni. In the surface of the framework of the metal porous body, the content of NiO is preferably lower than the content of the total of $Ni_2O_3$ and $Ni(OH)_2$.

By making the content of NiO lower than the content of Ni or the content of the total of $Ni_2O_3$ and $Ni(OH)_2$ in the surface of the framework of the metal porous body, a battery reaction can be promoted and the internal resistance of the battery can be reduced when the metal porous body is used as a positive electrode current collector for a battery in which $Ni(OH)_2$ is used as an active material.

As described above, comparison among the content of NiO, the content of Ni and the content of the total of $Ni_2O_3$ and $Ni(OH)_2$ in the surface of the framework of the metal porous body can be performed by comparing area sizes of the respective peaks when the surface of the framework of the metal porous body is analyzed using the XPS. That is, it is preferable that when the surface of the framework of the metal porous body according to an embodiment of the present disclosure is analyzed using the XPS, the peak of NiO is absent in a spectrum of a 1s orbital of O, and the area sizes of the peaks of Ni, NiO, $Ni_2O_3$, and $Ni(OH)_2$ satisfy a relational equation of Ni>the total of $Ni_2O_3$ and $Ni(OH)_2$>NiO in a spectrum of three orbitals in 2p of Ni. In the XPS analysis, the peaks of $Ni_2O_3$ and $Ni(OH)_2$ in the three orbitals in 2p of Ni are detected at positions of binding energy close to each other. The area of each peak can be calculated by peak fitting. "Three orbitals in 2p of Ni" described above refer to three (px, py and pz) orbitals in a p orbital (2p) of Ni.

A content of hydrogen in the surface of the framework of the metal porous body according to the embodiment of the present disclosure is preferably higher than a content of hydrogen in a surface of a framework of a conventional nickel porous body. As a result, when the metal porous body is used as a positive electrode current collector for a battery in which $Ni(OH)_2$ is used as an active material, the contact resistance between the surface of the framework of the metal porous body and the active material can be reduced and the internal resistance of the battery can be reduced. However, the metal porous body is the same as the conventional nickel porous body in terms of average pore diameter, porosity, metal apparent weight, and thickness.

Comparison of the content of hydrogen in the surface of the framework can be performed, for example, by analyzing the surface of the framework of the metal porous body and the surface of the framework of the conventional nickel porous body using the TDS.

In the metal porous body according to an embodiment of the present disclosure, it is preferable that oxygen is detected within a depth of 5 nm from the surface of the framework, and more preferably within a depth of 30 nm from the surface of the framework, and hydrogen is detected at least in the surface of the framework. As a result, when the metal porous body is used as a positive electrode current collector for a battery in which $Ni(OH)_2$ is used as an active material, the battery reaction can be promoted and the internal resistance of the battery can be reduced.

How far in the depth direction oxygen is present from the surface of the framework of the metal porous body can be confirmed by analyzing the framework of the metal porous body using the AES as described above. The presence of hydrogen in the surface of the framework of the metal porous body can be confirmed by the TDS analysis.

The apparent weight of the metal porous body according to an embodiment of the present disclosure is not particularly limited, and is preferably not less than 150 $g/m^2$ and not more than 500 $g/m^2$. When the apparent weight of the metal porous body is not less than 150 $g/m^2$, the strength of the metal porous body can be kept, and further, the metal porous body can offer sufficient current collection performance when the metal porous body is used as a current collector for a battery. When the apparent weight of the metal porous body is not more than 500 $g/m^2$, a unit mass is not increased excessively and further a sufficient amount of active material can be filled into the pore portion when the metal porous body is used as a current collector for a battery. From these perspectives, the apparent weight of the metal porous body is more preferably not less than 200 $g/m^2$ and not more than 450 $g/m^2$.

The apparent weight of the metal porous body refers to an apparent mass per unit area of the main surface of the metal porous body.

The metal porous body according to an embodiment of the present disclosure preferably has a thickness of not less than 0.5 mm and not more than 2.0 mm. When the metal porous body has a thickness of not less than 0.5 mm, the active material can be easily filled, and further, the number of frameworks of the metal porous body can be increased and the metal porous body can offer sufficient current collection performance. When the metal porous body has a thickness of not more than 2.0 mm, an amount of deformation during compression of the electrode can be reduced and an increase in resistance can be inhibited. From these perspectives, the thickness of the metal porous body is more preferably not less than 0.7 mm and not more than 1.5 mm.

When the metal porous body according to an embodiment of the present disclosure is used as an electrode for a battery, a thickness of the electrode is preferably not less than 0.1 mm and not more than 2.0 mm, and more preferably not less than 0.3 mm and not more than 1.0 mm, after the active material is filled into the pore portion of the metal porous body. The thicknesses of the metal porous body and the electrode can be adjusted, for example, by a roll press and the like.

The metal porous body according to an embodiment of the present disclosure preferably has an average pore diameter of not less than 250 μm and not more than 500 μm. When the metal porous body has an average pore diameter of not less than 250 μm, the active material can be easily filled and a sufficient amount of active material can be filled into the pore portion. When the metal porous body has an average pore diameter of not more than 500 μm, a surface area of the metal porous body can be increased and the metal porous body can offer sufficient current collection performance. From these perspectives, the average pore diameter of the metal porous body is more preferably not less than 300 μm and not more than 400 μm.

The average pore diameter of the metal porous body refers to an average pore diameter calculated as average pore diameter=25.4 mm/the number of cells by observing the surface of the metal porous body with a microscope or the like, and counting the number of pores per inch (25.4 mm) as the number of cells.

The metal porous body according to an embodiment of the present disclosure preferably has a porosity of not less than 80% and not more than 98%. When the porosity is not less than 80%, the active material can be easily filled and a sufficient amount of active material can be filled into the pore portion. When the porosity is not more than 98%, the strength of the metal porous body can be kept, and further, the metal porous body can offer sufficient current collection performance when the metal porous body is used as a current collector for a battery. From these perspectives, the porosity of the metal porous body is more preferably not less than 90% and not more than 96%.

The porosity of the metal porous body is defined in accordance with the following equation:

porosity=(1−(mass [g] of porous material/(volume [cm$^3$] of porous material×material density [g/cm$^3$]))×100 [%].

The above-described material density refers to a density calculated by multiplying a theoretical density of each component forming the metal porous body by the content of each component described above.

<Current Collector>

A current collector according to an embodiment of the present disclosure is a current collector for a nickel-metal hydride battery including the above-described metal porous body according to an embodiment of the present disclosure.

The current collector refers to a battery material that is responsible for maintaining electrical connection with the active material in the electrode of the battery, collecting electrons that move with a charging and discharging reaction, and extracting the electrons to the outside of the battery as a current. By causing the current collector to carry the active material, the current collector can function as an electrode.

The current collector for a nickel-metal hydride battery according to an embodiment of the present disclosure is a current collector for a nickel-metal hydride battery including a metal porous body, the metal porous body being mainly composed of nickel and having a framework of a three-dimensional network structure, Ni(OH)$_2$ being present in a surface of the framework, at least oxygen being detected within a depth of 5 nm from the surface, and preferably within a depth of 30 nm from the surface.

<Nickel-Metal Hydride Battery>

The nickel-metal hydride battery according to an embodiment of the present disclosure is a nickel-metal hydride battery including a positive electrode formed by filling an active material mainly composed of Ni(OH)$_2$ into a positive electrode current collector, a negative electrode including a hydrogen-storing alloy, a separator, and an electrolyte. The metal porous body according to an embodiment of the present disclosure is used as the positive electrode current collector.

A configuration of the nickel-metal hydride battery is not particularly limited as long as the metal porous body according to an embodiment of the present disclosure is used as the positive electrode current collector, and a configuration of a conventional nickel-metal hydride battery can be suitably used. For example, a cylindrical battery may be fabricated by interposing a separator between a positive electrode and a negative electrode to thereby obtain an electrode group, winding the electrode group to have a spiral shape, and inserting the spiral electrode group into an electrolyzer, into which an electrolyte is injected. A rectangular battery may be fabricated by stacking a positive electrode and a negative electrode with a separator being interposed, to thereby obtain an electrode group having a stacked structure, and inserting the electrode group into an electrolyzer, into which an electrolyte is injected.

A positive electrode formed by filling an active material mainly composed of nickel hydroxide into the pore portion of the metal porous body according to an embodiment of the present disclosure may be used as the positive electrode.

<Method for Manufacturing Metal Porous Body>

The above-described metal porous body according to an embodiment of the present disclosure can be manufactured in accordance with the following method, for example.

Specifically, in a method for manufacturing a metal porous body having:

a conductive treatment step of subjecting a surface of a framework of a resin molded body having a framework of a three-dimensional network structure to conductive treatment;

a resin structure formation step of plating the surface of the framework of the resin molded body subjected to conductive treatment with nickel, to thereby form a resin structure;

a first heat treatment step of subjecting the resin structure to heat treatment under oxidizing atmosphere and burning and removing a resin, to thereby form an oxidized metal porous body; and a second heat treatment step of subjecting the oxidized metal porous body to heat treatment under reducing atmosphere, to thereby reduce a metal, the metal porous body according to an embodiment of the present disclosure can be manufactured, for example, by further subjecting the metal porous body to treatment after the second heat treatment step as in a first method or a second method described below.

(First Method)

The first method is a method for surface-treating the metal porous body subjected to the second heat treatment step with acid, and then, washing the metal porous body with water and drying the metal porous body.

The acid used in the first method is not particularly limited, and hydrochloric acid, sulfuric acid, nitric acid, a mixture thereof or the like is preferably used. As a result, the surface of the framework of the metal porous body can be efficiently treated and it is possible to obtain the metal porous body in which a content of NiO is lower than a content of a total of $Ni_2O_3$ and $Ni(OH)_2$ in the surface of the framework. A method for treatment with the acid is not particularly limited, and a method for immersing the metal porous body in the acid may, for example, be used. When the time of treatment with the acid is too short, the treatment is insufficient. In contrast, when the time of treatment with the acid is too long, the strength of the metal porous body decreases. Therefore, the time of treatment with the acid is preferably not shorter than 5 seconds and not longer than 15 minutes, and more preferably not shorter than 10 seconds and not longer than 10 minutes.

After the acid treatment, the metal porous body is washed with water to remove the acid, and dried. When the drying temperature is too high, NiO is formed due to dehydration of $Ni(OH)_2$. Therefore, the metal porous body is preferably dried at a temperature of not higher than 200° C. When the drying temperature is too low, drying requires time, which may cause a poor appearance such as discoloration of the metal porous body. Therefore, the metal porous body is preferably dried at a temperature of not lower than 35° C. The more preferable drying temperature is not lower than 40° C. and not higher than 150° C. The drying time is not particularly limited and may be selected as appropriate in accordance with the drying temperature. In order to speed up drying, a method for removing a liquid droplet using a blower or the like is preferably used, for example.

(Second Method)

The second method is a method for immersing the metal porous body subjected to the second heat treatment step in water for a certain time period, and then, drying the metal porous body at a temperature of not higher than 100° C.

This method is a method for making a content of NiO lower than a content of a total of $Ni_2O_3$ and $Ni(OH)_2$ by modifying the surface of the framework of the metal porous body subjected to the second heat treatment step.

The time of immersion of the metal porous body in water is not particularly limited. However, when the time of immersion is too short, the treatment is insufficient. For example, the time of immersion may be not shorter than 3 hours and not longer than 24 hours, more preferably not shorter than 5 hours and not longer than 20 hours, and further preferably not shorter than 6 hours and not longer than 12 hours.

When the drying temperature is too high, NiO is formed due to dehydration of $Ni(OH)_2$. Therefore, the drying temperature is preferably not higher than 200° C. When the drying temperature is too low, drying requires time, which causes a poor appearance such as discoloration. Therefore, the drying temperature is preferably not lower than 35° C. The drying temperature is more preferably not lower than 40° C. and not higher than 150° C. The drying time is not particularly limited and may be selected as appropriate in accordance with the drying temperature. In order to speed up drying, a method for removing a liquid droplet using a blower or the like is preferably used.

Each step of the above-described method for manufacturing the metal porous body according to an embodiment of the present disclosure will be described in detail below.

—Conductive Treatment Step—

Figure 2:
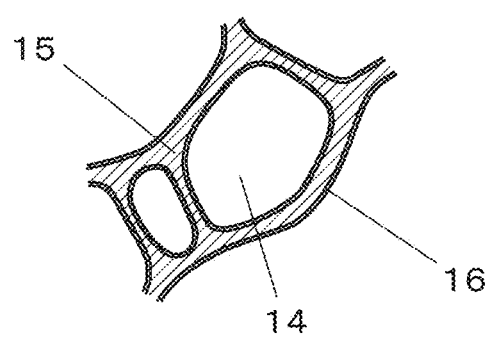
FIG. 2 is an enlarged view schematically showing a partial cross section of an example state in which a conductive coating layer is formed on a surface of a framework of foamed urethane resin.

This step is a step of preparing a resin molded body 15 having a framework of a three-dimensional network structure, and subjecting a surface of the framework of resin molded body 15 to conductive treatment, to thereby form a conductive coating layer 16, as shown in FIG. 2.

(Resin Molded Body)

A resin foam, non-woven fabric, felt, woven fabric or the like is used as resin molded body 15 having the framework of the three-dimensional network structure used when the metal porous body according to an embodiment of the present disclosure is manufactured, and these can also be used in combination as needed. Although a material is not particularly limited, a material that can be removed by incineration after being plated with metal is preferable. From the perspective of handling of resin molded body 15, resin molded body 15 is preferably made of a flexible material because high stiffness leads to fracture particularly in the case of sheet-like resin molded body 15.

Figure 3:
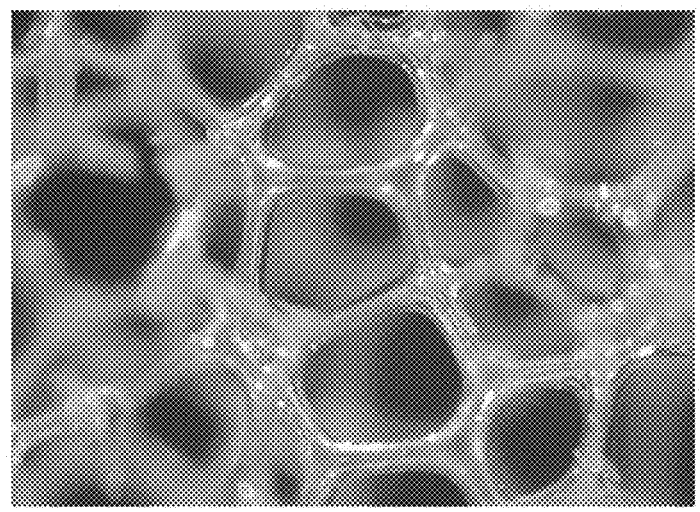
FIG. 3 is a photograph as a substitute for a drawing of foamed urethane resin in an example resin molded body having a framework of a three-dimensional network structure.
Figure 4:
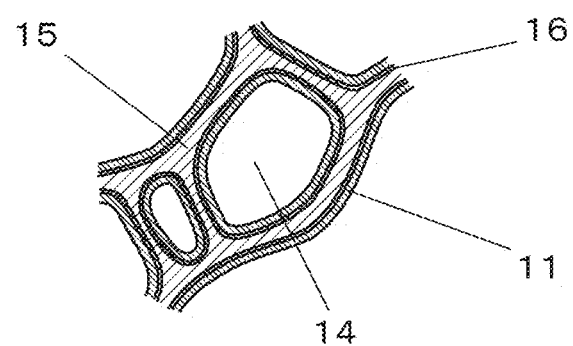
FIG. 4 is an enlarged view schematically showing a partial cross section of an example state in which a metal mainly composed of nickel is further formed on a surface of the conductive coating layer formed on the surface of the framework of the foamed urethane resin.

A resin foam is preferably used as resin molded body 15 having the framework of the three-dimensional network structure. A known or commercially available resin foam can be used as long as the resin foam is porous, and examples of the resin foam include foamed urethane, styrofoam and the like. Among these, foamed urethane is preferable, particularly from the perspective of a high porosity. FIG. 3 shows a photograph of foamed urethane resin.

A porosity of resin molded body 15 may be, for example, not less than 80% and not more than 98%, and more preferably not less than 90% and not more than 96%. A thickness of resin molded body 15 is not limited, either, and may be usually, for example, not less than 0.5 mm and not more than 2.0 mm, and preferably not less than 0.7 mm and not more than 1.5 mm. An average pore diameter of resin molded body 15 is not limited and can be set as appropriate in accordance with an application.

(Conductive Treatment)

A method for conductive treatment is not particularly limited as long as conductive coating layer 16 can be provided on the surface of the framework of resin molded body 15. Examples of a material of conductive coating layer 16 include amorphous carbon such as carbon black, and carbon powder such as graphite, in addition to metal such as nickel, titanium or stainless steel. Among these, the carbon powder is particularly preferable. When the amorphous carbon or the like other than the metal is used, conductive coating layer 16 is also removed in resin molded body removal treatment described below.

Specific examples of the conductive treatment preferably include electroless plating treatment, sputtering treatment and the like when nickel is used, for example. When the materials including metal such as titanium or stainless steel, carbon black, and graphite are used, examples of a preferable method include treatment for coating the surface of the framework of resin molded body 15 with a mixture obtained by adding a binder to a fine powder of these materials.

As the electroless plating treatment using nickel, resin molded body 15 may, for example, be immersed in a known electroless nickel plating bath such as a nickel sulfate aqueous solution containing sodium hypophosphite as a reducing agent. As needed, resin molded body 15 may be immersed in an activating solution (cleaning solution manufactured by Kanigen Co., Ltd.) including a very small amount of a palladium ion, before being immersed in the plating bath.

As the sputtering treatment using nickel, blown-off nickel particles may be deposited on the surface of the framework of resin molded body 15 by mounting resin molded body 15 on a substrate holder, and then, applying a DC voltage between the holder and the target (nickel) while introducing an inert gas, to thereby bring the ionized inert gas into collision with nickel.

Conductive coating layer 16 may be formed continuously on the surface of the framework of resin molded body 15. An apparent weight of conductive coating layer 16 is not limited, and may be usually not less than 5 g/m$^2$ and not more than 15 g/m$^2$, and preferably not less than 7 g/m$^2$ and not more than 10 g/m$^2$.

—Resin Structure Formation Step—

This step is a step of plating, with nickel, resin molded body 15 whose surface of the framework became conductive through the conductive treatment step, to thereby stack an electroplated layer, i.e., a metal 11 mainly composed of nickel.

(Electroplating Treatment)

When a thickness of a plating film is increased by both or one of the above-described electroless plating treatment and sputtering treatment, electroplating treatment is not particularly needed. However, from the perspectives of productivity and cost, a method for first subjecting resin molded body 15 to conductive treatment by the above-described method, and then, forming an electroplated layer of nickel by an electroplating method is preferably used.

The electroplating treatment may be performed in accordance with an ordinary method. For example, a known or commercially available bath can be used as the nickel plating bath, and examples of the nickel plating bath include a watt bath, a chloride bath, a sulfamic acid bath and the like. An electroplated coating can further be formed on conductive coating layer 16 by immersing resin molded body 15 having conductive coating layer 16 formed on the surface by electroless plating, sputtering or the like described above in the plating bath, and connecting resin molded body 15 to a negative electrode and a counter electrode plate of the plated metal to a positive electrode to apply a DC or pulse intermittent current.

The electroplated layer may be formed on conductive coating layer 16 to such an extent that conductive coating layer 16 is not exposed. An apparent weight of the electroplated layer is not limited, and may be usually not less than 150 g/m$^2$ and not more than 500 g/m$^2$, and more preferably not less than 200 g/m$^2$ and not more than 450 g/m$^2$. A total amount of conductive coating layer 16 and the electroplated layer described above is preferably not less than 200 g/m$^2$ and not more than 500 g/m$^2$. When the total amount of conductive coating layer 16 and the electroplated layer is not less than 200 g/m$^2$, the strength of the metal porous body can be kept excellently. When the total amount of conductive coating layer 16 and the electroplated layer is not more than 500 g/m$^2$, the metal porous body can be manufactured advantageously in terms of cost.

—First Heat Treatment Step—

This step is a step of subjecting the resin structure obtained above to heat treatment, to thereby remove resin molded body 15 used as a base material and leave only the electroplated layer.

Specifically, resin molded body 15 may be burned and removed by subjecting the resin structure to heat treatment under oxidizing atmosphere such as the air having a temperature of not lower than 600° C. and not higher than 800° C., and preferably not lower than 600° C. and not higher than 700° C.

—Second Heat Treatment Step—

This step is a step of reducing the oxidized metal porous body obtained by the first heat treatment step.

A hydrogen gas or a gas mainly composed of a mixed gas of a hydrogen gas and an inert gas is used as a reducing gas as needed, with a composition being changed. "Mainly composed of the mixed gas" means that a ratio of the hydrogen gas or the mixed gas of the hydrogen gas and the inert gas to the reducing gas is not less than 50% by volume.

By adding the inert gas as the reducing gas, the efficiency of the redox property is increased. $N_2$, argon, helium and the like can be preferably used as the inert gas. A forming gas, which is a mixed gas of $H_2$ and $N_2$ obtained by using an ammonia gas as a raw material gas and decomposing the ammonia gas, may be used as the reducing gas.

(Heat Treatment Temperature)

The second heat treatment step may be performed at a temperature of not lower than 900° C. From the perspectives of being disadvantage in terms of cost and a material of a furnace body of a reducing furnace, the second heat treatment step may be performed at a temperature of not higher than 1000° C.

By further applying the above-described first method or second method subsequently to the above-described steps, the metal porous body according to an embodiment of the present disclosure can be obtained.

EXAMPLES

While the present disclosure will be described in more detail below based on Examples, these Examples are provided by way of example and the metal porous body according to the present disclosure is not limited thereto. The scope of the present disclosure is defined by the terms of the claims and is intended to include any modifications within the scope and meaning equivalent to the terms of the claims.

Example 1

<Conductive Treatment of Resin Molded Body>

A polyurethane sheet having a thickness of 1.5 mm was used as a resin molded body having a framework of a three-dimensional network structure. The resin molded body had a porosity of 96% and an average pore diameter of 450 μm.

100 g of carbon black, which was amorphous carbon having a particle size of 0.01 to 0.2 μm, was dispersed in 0.5 L of a 10% acrylic ester-based resin aqueous solution, to thereby fabricate an adhesive paint at this ratio.

Next, the resin molded body was continuously immersed in the above-described adhesive paint, squeezed with a roller and then dried, to thereby form a conductive coating layer on a surface of the framework of the resin molded body. The resin molded body was thus subjected to conductive treatment.

<Electroplating Treatment>

500 g/m² of nickel was applied onto the surface of the framework of the resin molded body subjected to conductive treatment by electroplating, to thereby fabricate a resin structure having an electroplated layer on the surface of the framework.

<Removal of Resin Molded Body>

Next, in order to remove a resin component from the resin molded body having the conductive coating layer and the electroplated layer obtained above, a first heat treatment step of heating under atmospheric oxidizing atmosphere at 700° C. was performed.

Next, the reducing atmosphere formed of a reducing gas including a mixed gas of $H_2$ and $N_2$ (forming gas) at 1000° C. was formed in a heat treatment chamber where a second heat treatment step was performed, and the above-described metal porous body was introduced into the heat treatment chamber where the second heat treatment step was performed. As a result, nickel was reduced and annealed, to thereby obtain a sheet-like metal porous body.

<Acid Treatment>

The obtained metal porous body was immersed for 5 seconds in acid obtained by mixing 60% nitric acid and 35% hydrochloric acid at a volume ratio of 5:1, and then, was washed with water. Thereafter, the metal porous body was dried for 30 minutes in a hot-air high-temperature bath having a temperature of 45° C., to thereby obtain a metal porous body No. 1.

Example 2

A metal porous body No. 2 was fabricated similarly to Example 1, except that the time of immersion of the metal porous body in the acid was set at 10 seconds in Example 1.

Example 3

A metal porous body No. 3 was fabricated similarly to Example 1, except that the time of immersion of the metal porous body in the acid was set at 10 minutes in Example 1.

Example 4

A metal porous body No. 4 was manufactured similarly to Example 2, except that the acid obtained by mixing 60% nitric acid and 35% hydrochloric acid at the volume ratio of 5:1 was changed to 30% sulfuric acid in Example 2.

Comparative Example 1

A metal porous body No. A was fabricated similarly to Example 1, except that the metal porous body was not subjected to acid treatment in Example 1.

Comparative Example 2

A metal porous body No. B was fabricated similarly to Example 1, except that the time of immersion of the metal porous body in the acid was set at 1 second in Example 1.

Comparative Example 3

A metal porous body No. C was fabricated similarly to Example 2, except that the metal porous body was immersed in the acid and washed with water, and then, dried for 60 minutes in the hot-air high-temperature bath having a temperature of 240° C. in Example 2.

<Evaluation>

The surfaces of the frameworks of metal porous bodies No. 1 to No. 4 and metal porous bodies No. A to No. C obtained as described above were analyzed as follows.

—CV Measurement—

In not less than 10% by mass and not more than 35% by mass of a potassium hydroxide aqueous solution, each metal porous body was subjected to 30 potential scans between a lower limit potential of −0.10 V and an upper limit potential of +0.65 V with respect to a hydrogen standard potential.

—AES Analysis—

The surface of the framework of each metal porous body after CV measurement was subjected to element analysis in a depth direction using the AES, to thereby check a depth at which oxygen was detected. The AES analysis was performed under the following conditions, using the scanning Auger electron spectrometer ("PHI700" manufactured by ULVAC PHI).

Electron beam: 10 kV, 10 nA

Sample inclination: 30°

Sputter: 1 kV

—XPS Analysis—

The surface of the framework of each metal porous body before CV measurement was analyzed using the XPS, to thereby check a behavior of a peak in a 1s orbital of O and a behavior of a peak in three orbitals in 2p of Ni. The XPS analysis was performed under the following conditions, using "QuanteraSXM" manufactured by ULVAC PHI.

X-ray condition: beam diameter 100 μm, 25 W, 15 kV

Transmission energy: 55, 112 eV

Charge neutralization: electron +Ar

X-ray incident angle: 90°

Photoelectron extraction angle: 45°

—TDS Analysis—

The surface of the framework of each metal porous body after CV measurement was analyzed using the TDS, to thereby check whether or not a peak derived from hydrogen detected as water desorbed from the metal porous body at a temperature higher than an evaporation temperature of water, and a size of the above-described peak derived from hydrogen when the peak was detected. The TDS analysis was performed under the following conditions, using "TDS1200" manufactured by ESCO, Ltd.

Heating temperature: 50° C. to 1400° C. (stage temperature)

Temperature rising speed: 30° C./min (stage temperature control)

Measured mass number range: M/z=1 to 200 (measured in a fixed amount mode)

Sample pretreatment: A sample cut into 10 mm×10 mm was used as a measurement sample.

Figure 5:
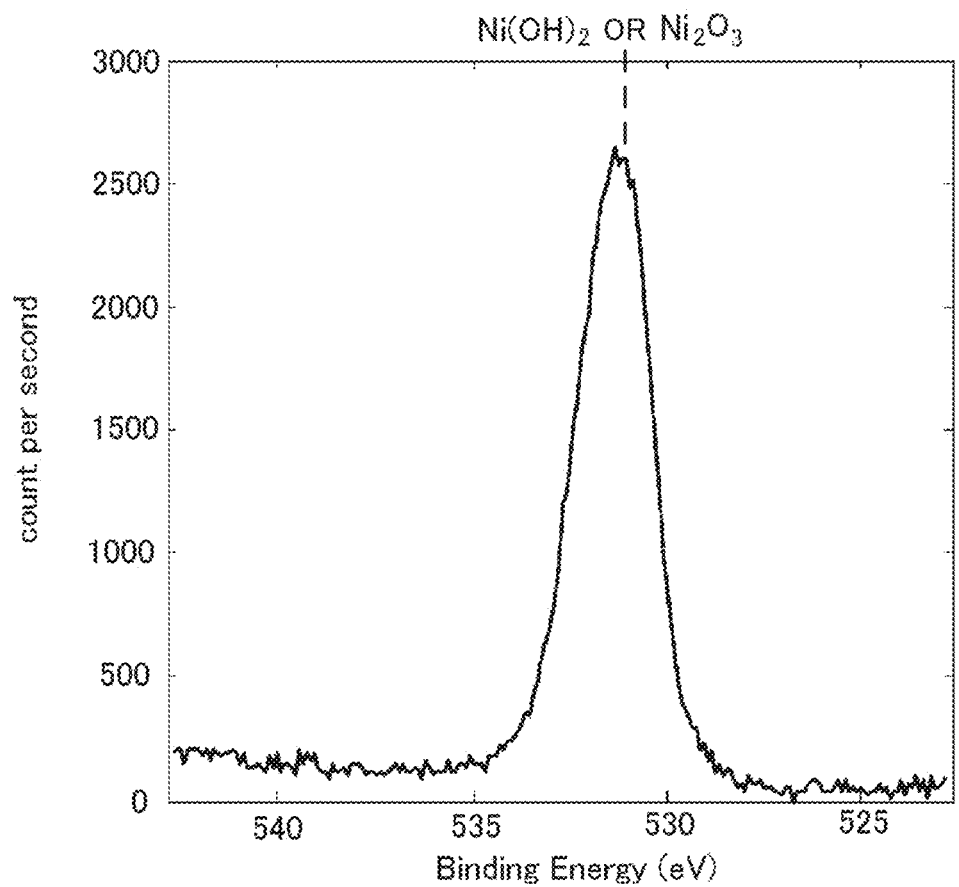
FIG. 5 is a spectrum of a 1s orbital of O showing a result of analysis of a metal porous body No. 2 by XPS.
Figure 6:
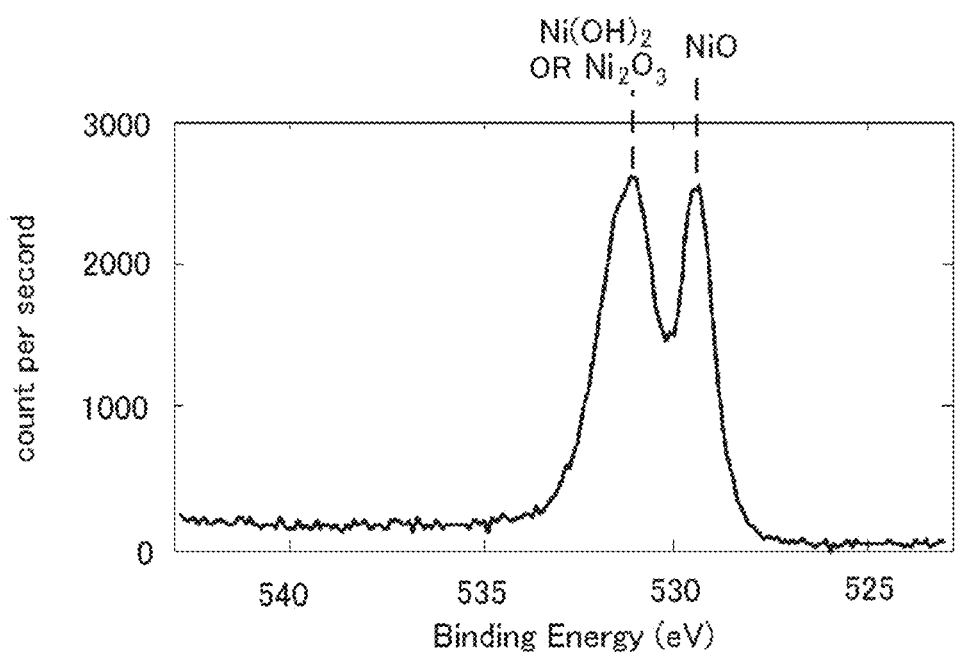
FIG. 6 is a spectrum of the 1s orbital of O showing a result of analysis of a metal porous body No. 4 by the XPS.
Figure 7:
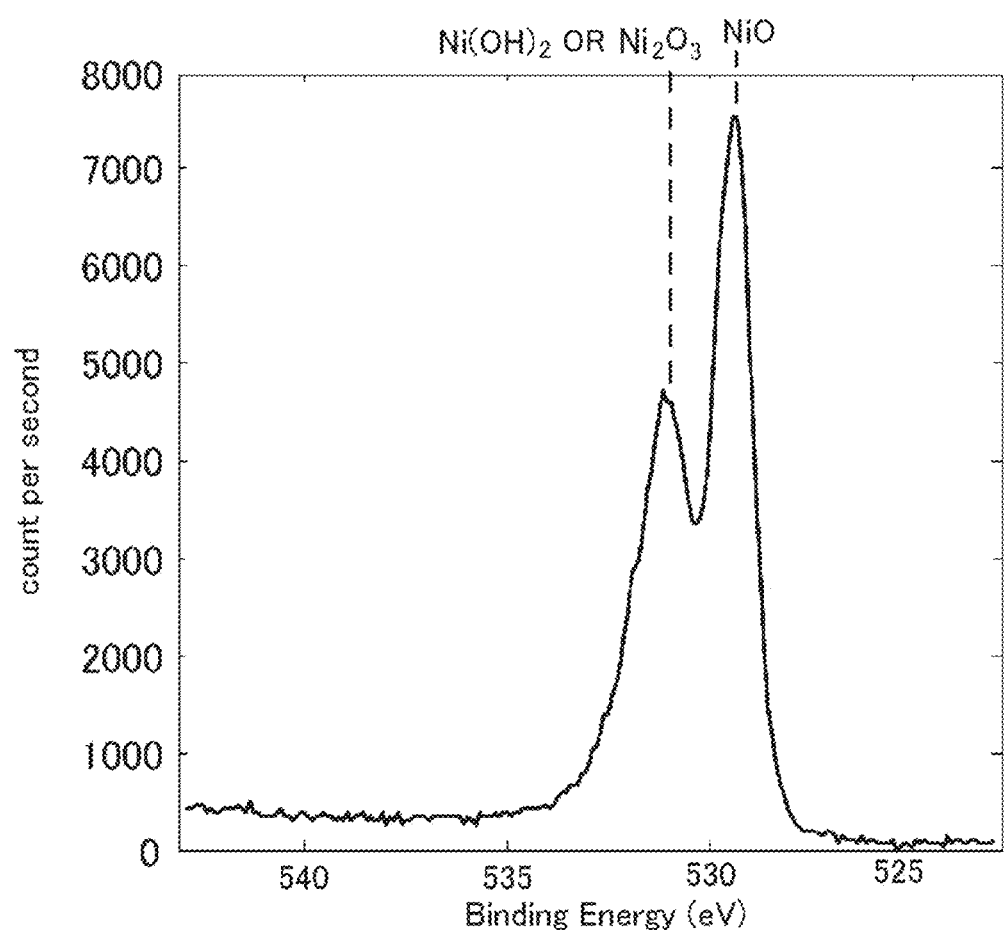
FIG. 7 is a spectrum of the 1s orbital of O showing a result of analysis of a metal porous body No. A by the XPS.
Figure 8:
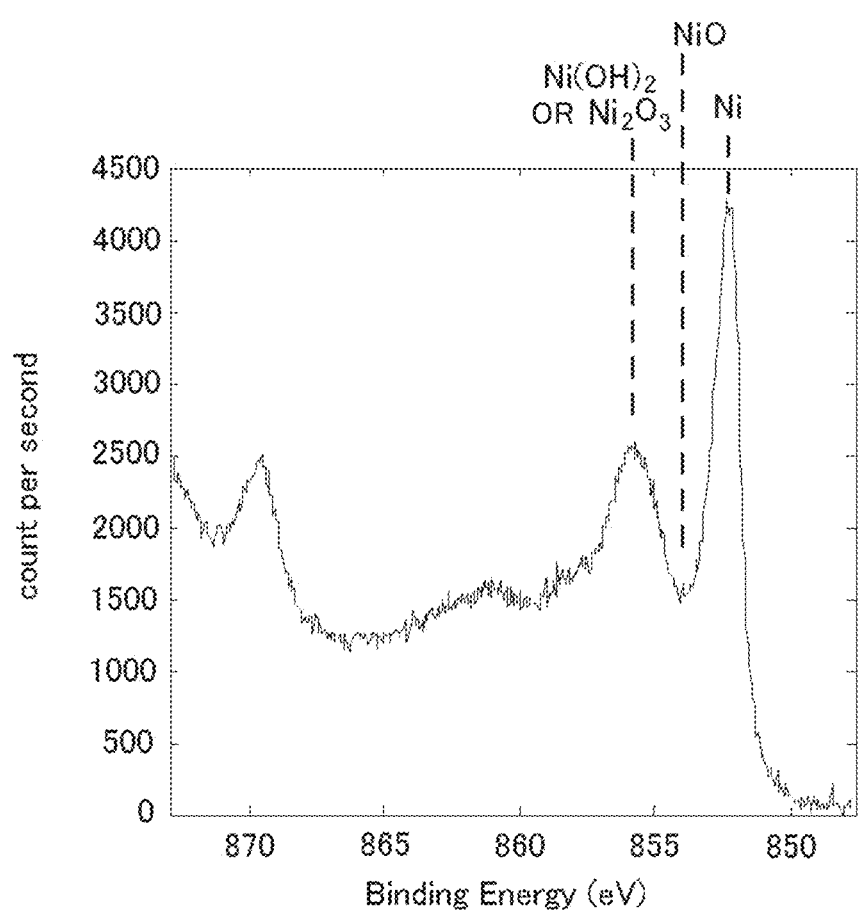
FIG. 8 is a spectrum of three orbitals in 2p of Ni showing a result of analysis of the metal porous body No. 2 by the XPS.
Figure 9:
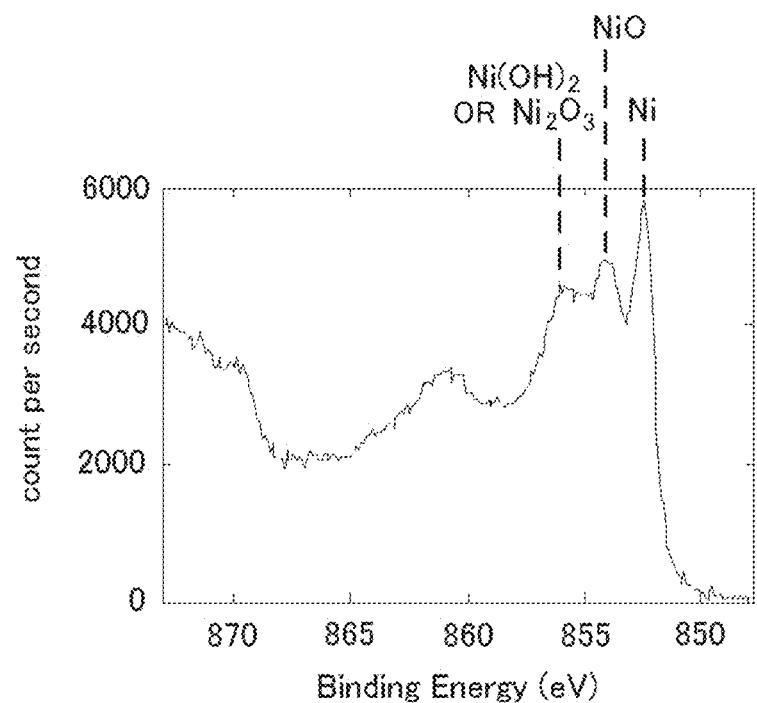
FIG. 9 is a spectrum of the three orbitals in 2p of Ni showing a result of analysis of the metal porous body No. 4 by the XPS.
Figure 10:
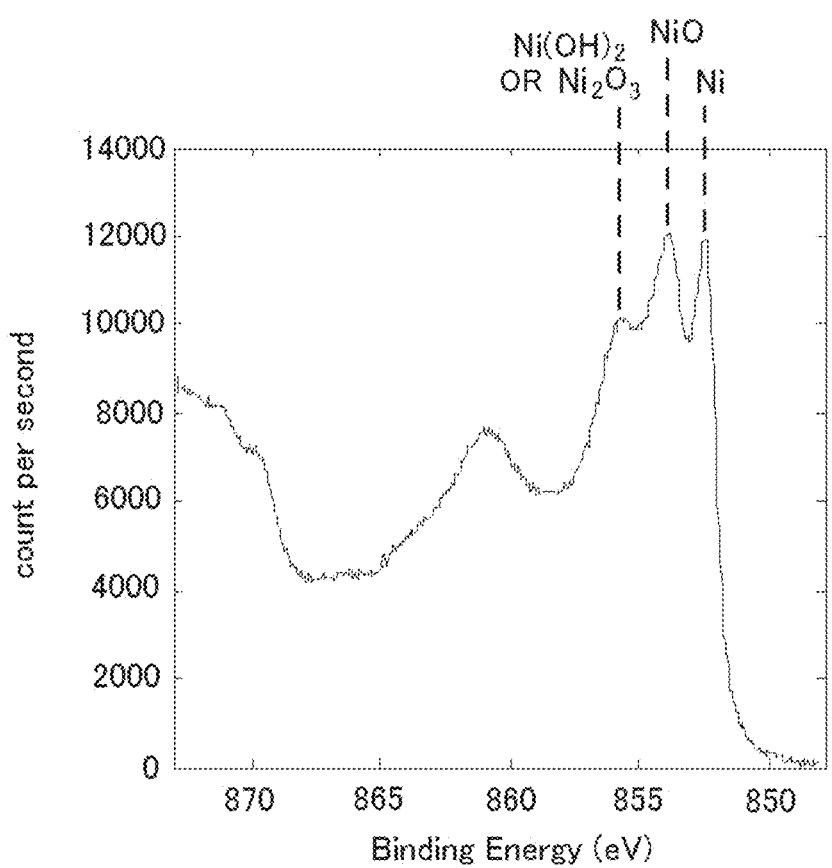
FIG. 10 is a spectrum of the three orbitals in 2p of Ni showing a result of analysis of the metal porous body No. A by the XPS.

Results of the AES analysis, the XPS analysis and the TDS analysis described above are shown in Table 1. Furthermore, the metal porous body No. 2, the metal porous body No. 4 and the metal porous body No. A were analyzed by the XPS, and their spectra of the 1s orbital of O are shown in FIGS. 5 to 7 and their spectra of the three orbitals in 2p of Ni are shown in FIGS. 8 to 10. In FIGS. 5 to 10, the vertical axis represents an absorption intensity and a horizontal axis represents binding energy (eV).

TABLE 1

| | AES analysis | XPS analysis | | | | TDS analysis Detection of hydrogen |
|---|---|---|---|---|---|---|
| | | 1s orbital | Three orbitals in 2p of Ni | | | |
| Metal porous body No. | Oxygen detection depth (nm) | Presence or absence of NiO peak | Ranking of area size of Ni peak | Ranking of area size of NiO peak | Ranking of area size of total of NiOH$_2$ and Ni$_2$O$_3$ peaks | Amount of peak derived from hydrogen detected at temperature higher than evaporation temperature of water |
| 1 | 6.0 | absent | 1 | no peak | 2 | large |
| 2 | 8.2 | absent | 1 | no peak | 2 | large |
| 3 | 15.0 | absent | 1 | no peak | 2 | large |
| 4 | 5.6 | present | 1 | 3 | 2 | large |
| A | 4.3 | present | 1 | 2 | 3 | small |
| B | 4.7 | present | 1 | 2 | 3 | small |
| C | 31 | present | 3 | 1 | 2 | none |

According to the result of the XPS analysis (see FIGS. 5 to 10), the peak of nickel oxide (NiO) was not detected and the peaks of nickel hydroxide (Ni(OH)$_2$) and nickel trioxide (Ni$_2$O$_3$) were higher in the metal porous bodies No. 1 to No. 3 in Examples 1 to 3, as compared with the metal porous body No. A in Comparative Example 1. Although the peak of nickel oxide (NiO) was also seen in the metal porous body No. 4 in Example 4, the peak height of nickel oxide (NiO) was lower and the area sizes of the peaks of nickel hydroxide (Ni(OH)$_2$) and nickel trioxide (Ni$_2$O$_3$) were reversed in the metal porous body No. 4 in Example 4, as compared with the metal porous body No. A in Comparative Example 1.

In the metal porous bodies No. 1 to No. 4 in Examples 1 to 4, the peak derived from hydrogen detected at the temperature higher than the evaporation temperature of water was large as a result of the TDS analysis, and thus, an amount of nickel hydroxide (Ni(OH)$_2$) on the surface of the framework was considered to be large.

In the metal porous bodies No. 1 to No. 4 in Examples 1 to 4, at least oxygen was detected within a depth of 5 nm from the surface of the framework as a result of the AES analysis. In the metal porous body No. A in Comparative Example 1 and the metal porous body No. B in Comparative Example 2, oxygen was detected only within a depth of 4.3 nm and 4.7 nm from the surface of the framework, respectively.

In the metal porous body No. B in Comparative Example 2, the peak of nickel hydroxide (Ni(OH)$_2$) was slightly seen as a result of the XPS analysis. However, the ranking of the area size of the peak was the same as that of the metal porous body No. A. The result of the TDS analysis was such that the height of the peak derived from hydrogen detected at the temperature higher than the evaporation temperature of water was low, and thus, an amount of nickel hydroxide (Ni(OH)$_2$) on the surface of the framework was considered to be small.

The metal porous body No. C in Comparative Example 3 was an example in which the drying temperature for the metal porous body No. 2 was set at 240° C. However, the oxygen detection depth was significantly deeper in the AES analysis, and as to the ranking of the area sizes of the peaks in the XPS, the area of the peak of nickel oxide (NiO) and the areas of the peaks of nickel hydroxide (Ni(OH)$_2$) and nickel trioxide (Ni$_2$O$_3$) were larger than the area of the peak of nickel (Ni). In the TDS analysis, there is no peak derived from hydrogen at the temperature higher than the evaporation temperature of water, and thus, nickel oxide (NiO) and nickel trioxide (Ni$_2$O$_3$), not nickel hydroxide (Ni(OH)$_2$), were considered to be present on the surface of the metal porous body No. C.

Figure 11:
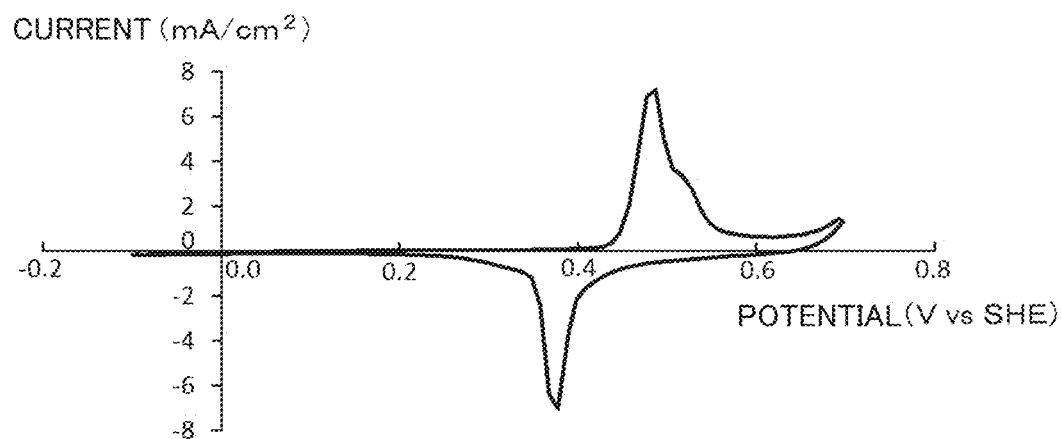
FIG. 11 is a graph showing a result of cyclic voltammetry measurement of a metal porous body No. 1.
Figure 12:
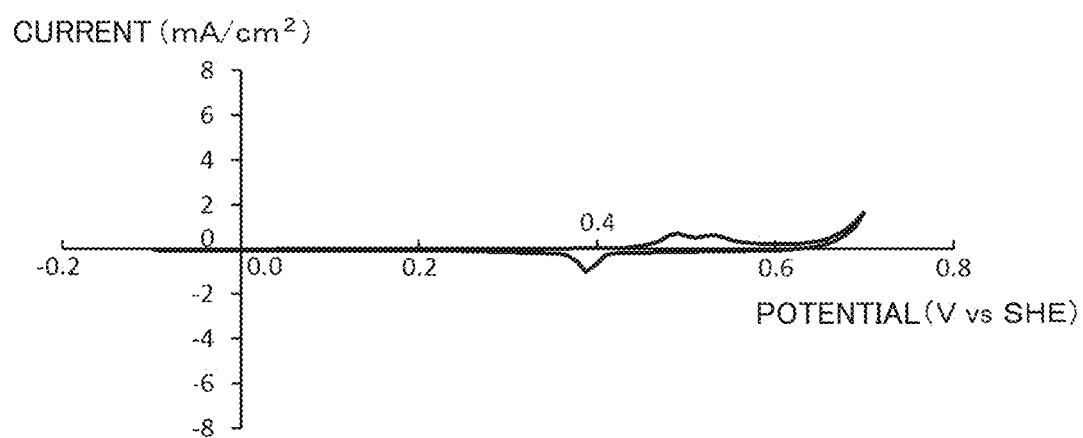
FIG. 12 is a graph showing a result of cyclic voltammetry measurement of the metal porous body No. A.

FIGS. 11 and 12 show an IV curve after the CV measurement of the metal porous body No. 1 in Example 1 and the metal porous body No. A in Comparative Example 1 is repeated 30 times. In FIGS. 11 and 12, the horizontal axis represents a potential (V vs SHE) and the vertical axis represents a current (mA/cm$^2$).

In Example 1, a current value at a potential corresponding to charging and discharging of nickel hydroxide (Ni(OH)$_2$) is large, which suggests that a large amount of nickel hydroxide (Ni(OH)$_2$) is generated on the surface of the framework. In contrast, in Comparative Example 1, a current value at the potential is very small, i.e., not more than 1/10 of that in Example 1, and thus, nickel hydroxide (Ni(OH)$_2$) is hardly generated. Based on this, when a conventional metal porous body having a surface of a framework covered with an oxide film as in Comparative Example 1 is used as a current collector for a nickel-metal hydride battery, contact between the surface of the framework of the metal porous body and the active material is nickel (surface of framework)/nickel oxide/nickel hydroxide (active material), which is contact with the nickel oxide (NiO) film being interposed, and thus, resistance is considered to be high. In contrast, unlike Comparative Example 1, the surface of the framework of the metal porous body in Example 1 is covered with nickel hydroxide (Ni(OH)$_2$). Therefore, contact between the surface of the framework of the metal porous body and the active material is nickel/nickel hydroxide (surface of framework)/nickel hydroxide (active material), which is contact with nickel oxide (NiO) not being interposed. Based on the foregoing, when the metal porous body according to an embodiment of the present disclosure is used as a current collector for a nickel-metal hydride battery, the contact resistance between the metal porous body and the active material can be significantly reduced and the internal resistance of the battery can be reduced.

REFERENCE SIGNS LIST 10 metal porous body; 11 metal mainly composed of nickel; 12 framework; 13 interior of framework; 14 pore portion; 15 resin molded body; 16 conductive coating layer.

The invention claimed is:

1. A metal porous body mainly composed of nickel and having a framework of a three-dimensional network structure, Ni(OH)$_2$ being present in a surface of the framework, when the metal porous body is subjected to at least 30 potential scans between a lower limit potential of −0.10 V and an upper limit potential of +0.65 V with respect to a hydrogen standard potential in not less than 10% by mass and not more than 35% by mass of a potassium hydroxide aqueous solution, at least oxygen being detected within a depth of 5 nm from the surface, and hydrogen being detected at least in the surface.

2. The metal porous body according to claim 1, wherein a content of NiO is lower than a content of Ni in the surface.

3. The metal porous body according to claim 1, wherein a content of a combined total of Ni$_2$O$_3$ and Ni(OH)$_2$ is higher than a content of NiO in the surface.

4. The metal porous body according to claim 1, wherein the oxygen is detected by analyzing the surface in a depth direction of the framework using Auger electron spectroscopy (AES).

5. The metal porous body according to claim 1, wherein Ni, NiO, Ni$_2$O$_3$, and Ni(OH)$_2$ are detected by analyzing the surface using X-ray photoelectron spectroscopy (XPS).

6. The metal porous body according to claim 5, wherein a peak of the NiO is absent in a spectrum of a 1s orbital of O, and area sizes of peaks of the Ni, the NiO, the Ni$_2$O$_3$, and the Ni(OH)$_2$ satisfy a relational equation of Ni>a total of Ni$_2$O$_3$ and Ni(OH)$_2$>NiO in a spectrum of three orbitals in 2p of the Ni.

7. The metal porous body according to claim 1, wherein the hydrogen is detected as water desorbed from the metal porous body at a temperature higher than an evaporation temperature of water adsorbed on the surface, by analyzing the surface using thermal desorption spectrometry (TDS).

8. The metal porous body according to claim 1, wherein the Ni(OH)$_2$ is detected as a binding energy-derived peak corresponding to the Ni(OH)$_2$ by analyzing the surface using X-ray photoelectron spectroscopy (XPS), and the hydrogen is detected as water desorbed from the metal porous body at a temperature higher than an evaporation temperature of water adsorbed on the surface, by analyzing the surface using thermal desorption spectrometry (TDS).

9. A current collector for a nickel-metal hydride battery including the metal porous body as recited in claim 1.

10. A current collector for a nickel-metal hydride battery including a metal porous body, the metal porous body being mainly composed of nickel and having a framework of a three-dimensional network structure, Ni(OH)$_2$ being present in a surface of the framework, at least oxygen being detected within a depth of 5 nm from the surface.

* * * * *